(12) United States Patent
Demaree

(10) Patent No.: US 11,146,101 B2
(45) Date of Patent: Oct. 12, 2021

(54) NETWORK POWER FAILURE ALERT SYSTEM

(71) Applicant: Steven Demaree, Shreveport, LA (US)

(72) Inventor: Steven Demaree, Shreveport, LA (US)

( * ) Notice: Subject to any disclaimer, the term of this patent is extended or adjusted under 35 U.S.C. 154(b) by 116 days.

(21) Appl. No.: 16/669,684

(22) Filed: Oct. 31, 2019

(65) Prior Publication Data

US 2021/0135485 A1 May 6, 2021

(51) Int. Cl.
*H02J 9/06* (2006.01)
*H04L 12/66* (2006.01)
*H04L 29/12* (2006.01)

(52) U.S. Cl.
CPC .............. *H02J 9/061* (2013.01); *H04L 12/66* (2013.01); *H04L 61/2503* (2013.01)

(58) Field of Classification Search
CPC ....... H02J 9/061; H04L 61/2503; H04L 12/66
See application file for complete search history.

(56) References Cited

U.S. PATENT DOCUMENTS

| | | | |
|---|---|---|---|
| 7,560,831 B2* | 7/2009 | Whitted | G06F 1/30 307/64 |
| 8,670,663 B2 | 3/2014 | Mahony | |
| 8,787,751 B2 | 7/2014 | Shaffer | |
| 9,135,582 B2 | 9/2015 | Tadano | |
| 9,495,865 B2 | 11/2016 | Hicks, II | |
| 9,942,144 B1* | 4/2018 | Ramalingam | H04L 45/745 |
| 2006/0034449 A1 | 2/2006 | Joerger | |
| 2009/0016721 A1 | 1/2009 | Wurst | |
| 2016/0179640 A1 | 6/2016 | Murata | |
| 2020/0379548 A1* | 12/2020 | Dupree | G06F 1/305 |

* cited by examiner

*Primary Examiner* — Toan T Vu

(57) ABSTRACT

A network power failure alert system for recognizing network outages and locating power failures includes a plurality of uninterruptable power sources, a plurality of location networks, and a data center. Each uninterruptable power source is configured to connect to an alternating current power source. Each location network comprises a site router and a plurality of switches. A power supply of the site router is in operational communication with the uninterruptable power source. Each switch is in operational communication with the site router and the uninterruptable power source. The data center comprises a primary core router in operational communication with the site router of each location network, the uninterruptable power source, and a plurality of network stations.

4 Claims, 3 Drawing Sheets

NETWORK POWER FAILURE ALERT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to information technology (IT) devices and more particularly pertains to a new IT device for recognizing network outages and locating power failures.

(2) Description of Related Art Including Information Disclosed Under 37 CFR 1.97 and 1.98

The prior art relates to IT devices.

BRIEF SUMMARY OF THE INVENTION

An embodiment of the disclosure meets the needs presented above by generally comprising a plurality of uninterruptable power sources, a plurality of location networks, and a data center. Each uninterruptable power source is configured to connect to an alternating current power source. Each location network comprises a site router and a plurality of switches. A power supply of the site router is in operational communication with the uninterruptable power source. Each switch is in operational communication with the site router and the uninterruptable power source. The data center comprises a primary core router in operational communication with the site router of each location network, the uninterruptable power source, and a plurality of network stations.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
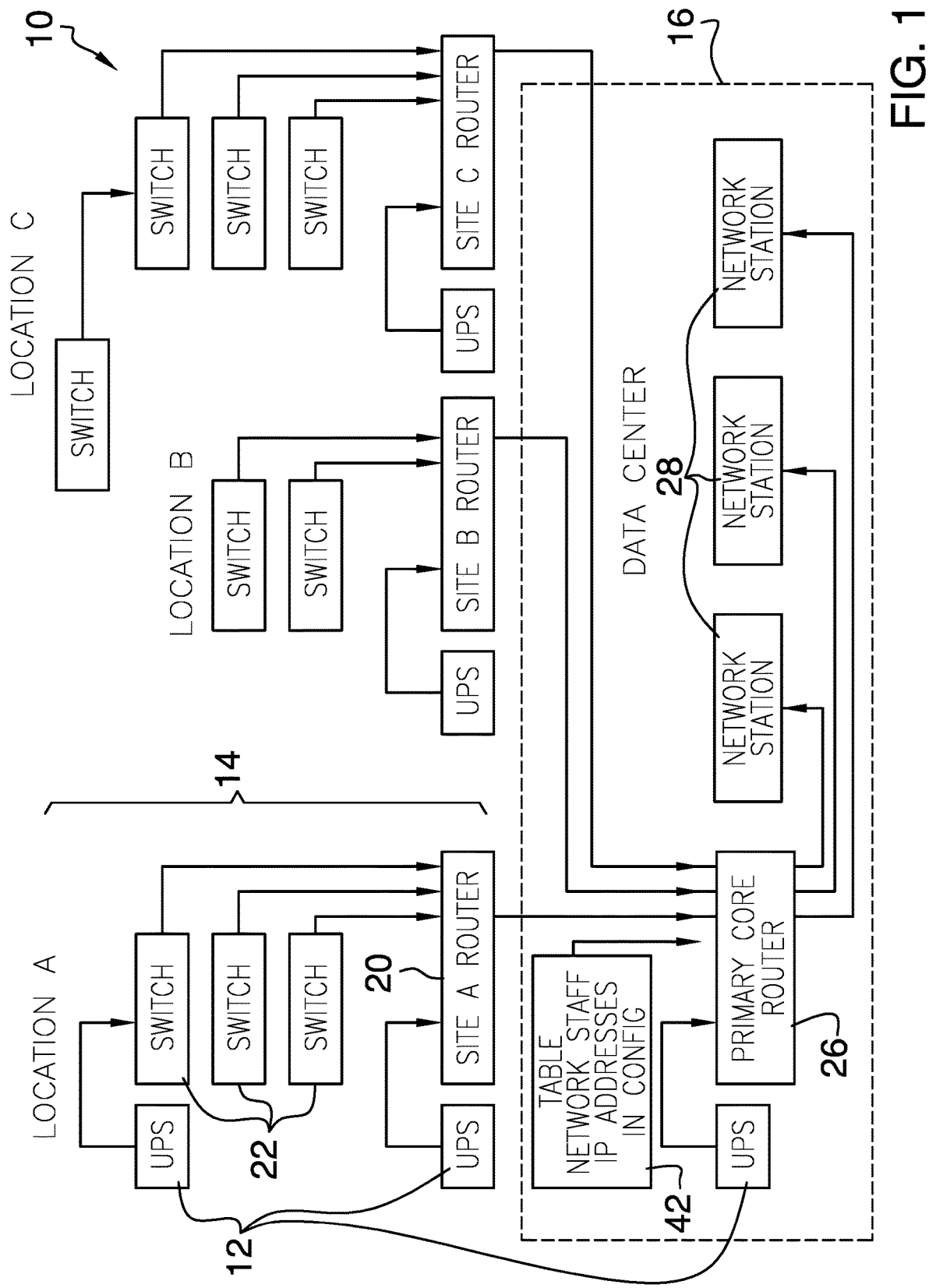
FIG. 1 is a block diagram of a network power failure alert system according to an embodiment of the disclosure.
Figure 3:
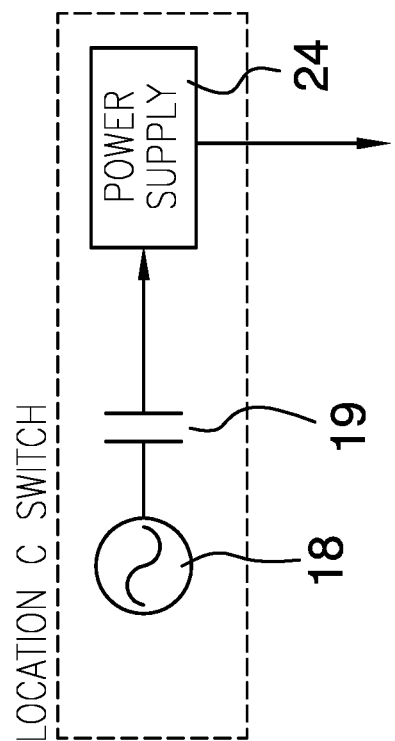
FIG. 3 is a block diagram of an embodiment of the disclosure.
Figure 2:
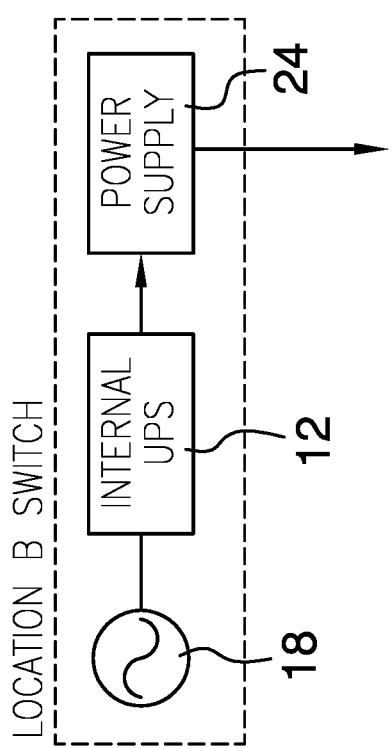
FIG. 2 is a block diagram of an embodiment of the disclosure.
Figure 4:
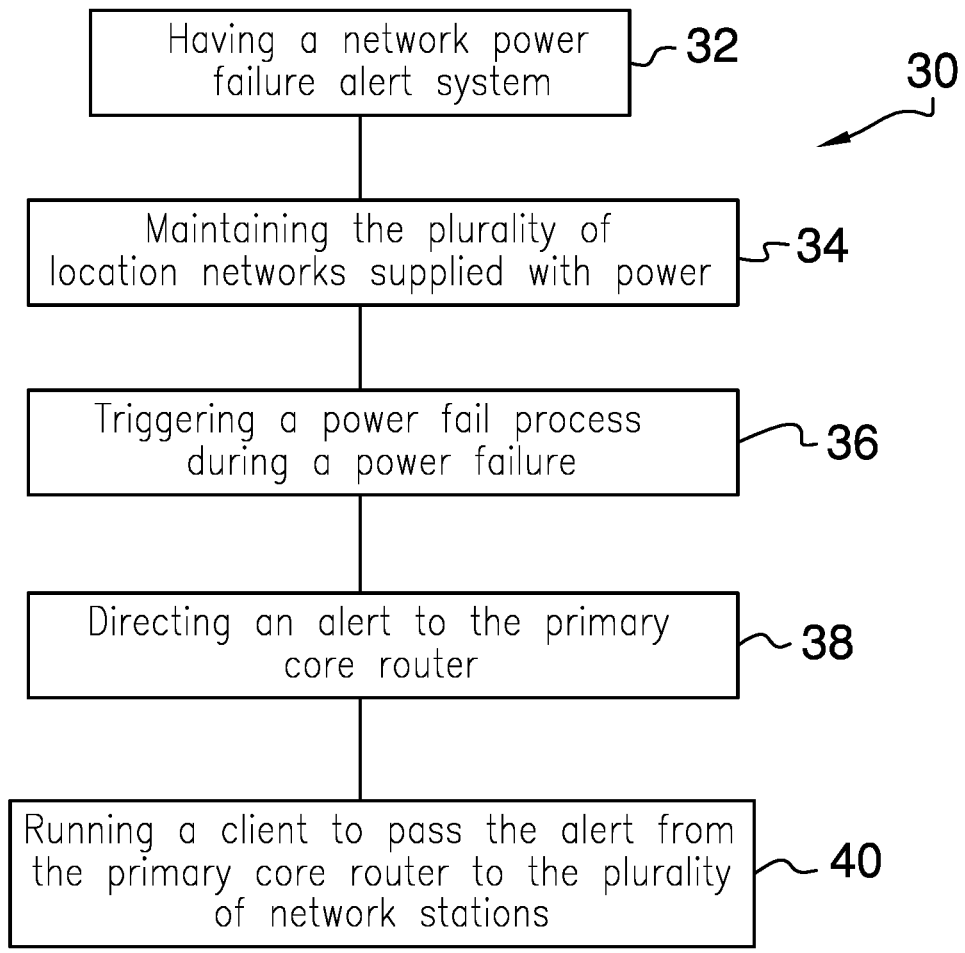
FIG. 4 is a block diagram of a method utilizing an embodiment of the disclosure.

With reference now to the drawings, and in particular to FIGS. 1 through 4 thereof, a new IT device embodying the principles and concepts of an embodiment of the disclosure and generally designated by the reference numeral 10 will be described.

As best illustrated in FIGS. 1 through 4, the network power failure alert system 10 generally comprises a plurality of uninterruptable power sources 12, a plurality of location networks 14, and a data center 16. Each uninterruptable power source 12 is configured to connect to an alternating current power source 18. The uninterruptable power source 12 may be a capacitor 19. Each location network 14 comprises a site router 20 and a plurality of switches 22. A power supply 24 of the site router is in operational communication with the uninterruptable power source 12. Each switch 22 is in operational communication with the site router 20 and the uninterruptable power source 12. The data center 16 comprises a primary core router 26 in operational communication with the site router 20 of each location network 14, the uninterruptable power source 12, and a plurality of network stations 28.

In use, the network power failure alert system 10 allows for a method of detecting network power failures 30. A step 32 comprises having a network power failure alert system 10 comprising the plurality of uninterruptable power sources 12, the plurality of location networks 14, and the data center 16. A step 34 comprises maintaining the plurality of location networks 14 supplied with power during a power failure to operate a running configuration and a plurality of uplink and downlink ports. A step 36 comprises triggering a power fail process during the power failure. A step 38 comprises directing an alert to the primary core router 26 from the site router 20 or the switch 22 with the power failure. The alert may comprise a hostname and an IP address of the site router 20 or the switch 22 with the power failure. A step 40 comprises running a client of the data center 16 to pass the alert from the primary core router 26 to the plurality of network stations 28 of a network staff. A table of network staff IP addresses 42 is stored within the primary core router 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A network power failure alert system comprising:
    a plurality of uninterruptable power sources, each uninterniptable power source being configured to connect to an alternating current power source;
    a plurality of location networks, each location network comprising:
        a site router, a power supply of the site router being in operational communication with the uninterruptable power source; and
        a plurality of switches, each switch being in operational communication with the site router and the uninterruptable power source; and
    a data center, the data center comprising:
        a primary core router, the primary core router being in operational communication with the site router of each location network and the unintemiptable power source; and
        a plurality of network stations, each network station being in operational communication with the primary core router.

2. The network power failure alert system of claim 1 further comprising each uninterruptable power source being a capacitor.

3. A method of detecting network power failures comprising:
    having a network power failure alert system, the network power failure alert system comprising:
        a plurality of uninterruptable power sources, each uninterruptable power source being configured to connect to an alternating current power source;
        a plurality of location networks, each location network comprising:
            a site router, a power supply of the site router being in operational communication with the uninterruptable power source; and
            a plurality of switches, each switch being in operational communication with the site router and the uninterruptable power source; and
        a data center, the data center comprising:
            a primary core router, the primary core router being in operational communication with the site router of each location network and the uninterruptable power source; and
            a plurality of network stations, each network station being in operational communication with the primary core router;
    maintaining the plurality of location networks supplied with power during a power failure to operate a running configuration and a plurality of uplink and downlink ports;
    triggering a power fail process during the power failure;
    directing an alert to the primary core router from the site router or the switch with the power failure; and
    running a client of the data center to pass the alert from the primary core router to the plurality of network stations of a network staff.

4. The method of detecting network power failures of claim 3 further comprising the alert comprising a hostname and an IP address of the site router or the switch with the power failure.

* * * * *